(12) United States Patent
Viaud

(10) Patent No.: US 8,603,553 B2
(45) Date of Patent: Dec. 10, 2013

(54) CHEESE PRODUCTS PROVIDED WITH A SOFT EXTRUDED CHEESE TEXTURE AND FERMENTED MILK PRODUCT TASTE AND METHOD FOR PRODUCING SAID CHEESE PRODUCTS

(75) Inventor: Florence Viaud, Voiteur (FR)

(73) Assignee: Fromageries Bel, Paris (FR)

( * ) Notice: Subject to any disclaimer, the term of this patent is extended or adjusted under 35 U.S.C. 154(b) by 709 days.

(21) Appl. No.: 10/574,352

(22) PCT Filed: Sep. 29, 2004

(86) PCT No.: PCT/FR2004/002470
§ 371 (c)(1),
(2), (4) Date: Jul. 10, 2006

(87) PCT Pub. No.: WO2005/032266
PCT Pub. Date: Apr. 14, 2005

(65) Prior Publication Data
US 2007/0014894 A1    Jan. 18, 2007

(30) Foreign Application Priority Data

Oct. 2, 2003  (FR) ...................................... 03 11567

(51) Int. Cl.
*A23C 9/12* (2006.01)

(52) U.S. Cl.
USPC ............................................................ 426/36

(58) Field of Classification Search
USPC ............................................................ 426/36
See application file for complete search history.

(56) References Cited

U.S. PATENT DOCUMENTS

| | | | |
|---|---|---|---|
| 4,719,113 A * | 1/1988 | Kharrazi | 426/35 |
| 5,902,625 A | 5/1999 | Barz et al. | |
| 6,319,526 B1 * | 11/2001 | Dahlstrom et al. | 426/36 |
| 2002/0127301 A1 | 9/2002 | Thakar et al. | |
| 2002/0187237 A1 * | 12/2002 | Kempter et al. | 426/582 |

FOREIGN PATENT DOCUMENTS

| | | |
|---|---|---|
| DE | 23 58 414 | 5/1975 |
| EP | 0 353 728 | 4/1993 |
| EP | 0 815 737 | 1/1998 |

* cited by examiner

*Primary Examiner* — D. Lawrence Tarazano
*Assistant Examiner* — Hamid R Badr
(74) *Attorney, Agent, or Firm* — Young & Thompson

(57) ABSTRACT

Method for producing novel cheese products having a fibrous texture and a fresh and lactic taste by processing an initial raw material which includes a drawn-curd cheese having a firm and fibrous texture, adding a defined quantity of fermented milk product and processing the mixture.

24 Claims, No Drawings

CHEESE PRODUCTS PROVIDED WITH A SOFT EXTRUDED CHEESE TEXTURE AND FERMENTED MILK PRODUCT TASTE AND METHOD FOR PRODUCING SAID CHEESE PRODUCTS

The invention relates to a method for producing novel cheese products having a fibrous texture and a fresh and lactic taste by processing an initial raw material comprising a drawn-curd cheese having a firm and fibrous texture, adding a defined quantity of fermented milk product and processing the mixture.

Cheese product having a fibrous texture is intended to refer to a product which is obtained according to the methods used in dairies to produce drawn-curd cheeses, the most well-known representative of this group being mozzarella. The method for producing these products is well known to the one skilled in the art; it is described, for example, in the publication entitled "LE FROMAGE" (Cheese) by A. Eck (ED. Tec § Doc-1997, p. 357). It is characterised by an emphasis on the draining, a baking step and a drawing step which confer on the final product its specific texture: compact, resilient and fibrous. This texture is advantageous since it is much sought after by the consumer, with the market for mozzarella expanding. However, these products, since they are not subjected to any subsequent refining steps, have a taste which is slightly acidic (pH of between 5.15 and 5.20) but which is generally neutral and bland, which limits their use as cold culinary ingredients (salad) or hot culinary ingredients (pizza).

Fermented milk products are intended to refer to products which are obtained by the multiplication of lactic acid bacteria in a milk preparation which brings about the coagulation or thickening thereof and confers thereon a more or less pronounced acid flavour. The particular characteristics of the various fermented milks are a result of the specific variation of some factors, such as the composition of the milk, the incubation temperature (linked to the type of ferments or micro-organisms used since this is dependent on the optimum conditions for their development), the lactic acid flora or non-lactic acid flora. The most well-known representative of this group is yoghurt but there are a considerable number of other fermented products whose microbial flora is different from that of yoghurt; these milks have very variable textures; these include thick products, others which are flowable and finally ones which are liquid; in the same manner, there is a large degree of variety in the acidity of these products: from slightly acidic to very acidic. There are four zones in which these products have been extensively developed; the Nordic countries (Skyr, Lettemjölk, etc. . . . ), the Mediterranean basin (Leben, Toulum), Russia and other Eastern countries (Kefir, Koumiss) and North America ("cultured buttermilk").

One of the main characteristics of these products is their low content of dry-extract, generally less than 30%. By way of illustration, that of yoghurts is between 10% and 20%.

These products are characterised by specific aromatic profiles which are conferred on them by the presence of aromatic compounds originating from the fermentation of milk by the cultured flora.

The specific taste of yoghurt is thus a result of the presence of aromatic compounds, such as acetaldehyde, diacetyl and acetoin, compounds originating from the conversion of lactic acid obtained by fermentation of the milk by the two specific bacteria of yoghurt: *Streptococcus thermophilus* and *Lactobacillus bulgaricus*.

It therefore appeared advantageous to the applicant to propose to the consumer novel cheese products which would have both a compact, resilient and fibrous texture sought after by the consumer and an acidic taste of a fermented milk product such as yoghurt (a taste which is also greatly appreciated by the consumer) and which can be consumed in their existing state (to nibble on, slice or spread) or as a culinary ingredient (salads, sandwiches, panini).

Although it is possible to envisage making products having a compact, resilient and fibrous texture and having an aromatic profile which is characteristic of fermented milk products, provided by the development of specific ferments, by culturing the milk to be transformed into cheese with these ferments, the ferments are however, inactivated during the step for baking the thin slices or cossettes of curds in whey at 70-85° C., a step which is characteristic of the production of drawn curds for cheeses, and will therefore not be able to develop to strengthen the characteristic taste obtained by the development of the ferments when offered for sale. Furthermore, so that this method confers on the final product the desired aromatic characteristics, it would be necessary to add to the milk a significant quantity of specific ferments since there is also a loss of ferments during the draining step.

In commerce and in the literature (see, for example, patent application EP 0 815 737), spreading cheeses are found on which a taste of yoghurt or other fermented products has been conferred; in this case, the method involves incorporating the fermented product after thermal processing involving melting in order to prevent the inhibition of the ferments and any aromatic loss arising during this thermal processing involving melting. However, it is impossible to obtain fibrous textures in this manner since the melting processing operation removes the structure of the initial texture of the drawn curd and this fibrous texture is therefore not present in the final product.

The authors of patent EP 0 535 728 themselves describe a method which is intended to produce cheese products which have a taste, texture and consistency of ripened cheeses by mixing fresh cheeses with pressed curds and processing this mixture at a temperature of between 35 and 65° C. However, the fresh product used has a dry-extract greater than 40%; and represents the main part of the mixture (greater than or equal to 30%). Furthermore, the objective of this patent EP 0 535 728 is to confer a ripened cheese taste on fresh products, that is to say, to produce "ripened" products with no maturing step by adding ripened products to a neutral or slightly acidic base; furthermore, the texture of the final products ranges from the non-homogeneous "curdled" type to a "semolina-like" texture type owing to the quantity of fresh product added (>30%).

All these prior methods do not allow products to be made which have a compact, resilient and fibrous texture and a fresh acidic taste conferred by a fermented milk product which comprises a live flora. In order to allow products of this type to be made, the applicant has developed a new production method which eliminates the above-mentioned disadvantages and allows cheese products of this type to be produced and offered to the consumer.

The subject-matter of the invention is therefore a new method for producing cheese products having a firm, resilient and fibrous texture and having the aromatic characteristics of fermented milk products, which method allows the live flora required to produce aromatic properties characteristic of the fresh fermented milk product to be maintained in the final product.

It also relates to novel cheese products which are obtained using this method and which have a firm, resilient and fibrous texture, a dry-extract content greater than 40% and specific aromatic properties of the fermented milk products.

DEFINITIONS

"Drawn-curd cheese" is intended to refer to a cheese which is obtained from a milk by means of enzymatic coagulation, the curds being drained by means of cutting and mixing, then left to rest until a pH of 5.15-5.20 is obtained. The draining of the curds is then enhanced by a drawing step which consists in immersing the curds, whole or separated into slices or cossettes, in warm whey or water (70 to 85° C.) for from 10 to 20 minutes, the cheese mass obtained then being kneaded and drawn. This step modifies the texture of the product which becomes compact and resilient but contributes to the destruction of the majority of the micro-organisms and enzymes. The main examples of drawn-curd cheese are mozzarella, provolone and cacciocavallo. In the context of the invention, any drawn-curd cheese can be used provided that this cheese has a neutral taste, so as not to interfere with the fresh and acidic taste provided by the fermented milk product. In this manner, cheeses such as provolone and cacciocavallo, which are generally sold after refinement, can be used to carry out the method according to the invention when they are young, that is to say, slightly ripened or unripened.

"Pressed-curd cheese" is intended to refer to a cheese which is obtained by means of coagulation of milk using rennet, cutting the curds, mixing, sometimes washing, and whose draining is not spontaneous but accelerated and supplemented by pressing, by hand or mechanically. Examples of pressed-curd cheeses include flexible pressed-curd chesses (which have a dry-extract of between 45 and 55%), such as Saint Paulin, Port Salut, gouda, mimolette, or firm pressed-curd cheeses (having a dry-extract greater than or equal to 55%), such as cheddar, edam, cantal.

The term "fermented milk product" is reserved for a milk product prepared with skimmed or non-skimmed milks, or milks which are concentrated or in the form of powder, which are skimmed or non-skimmed, and to which milk constituents may or may not have been added, and which have been subjected to a thermal processing operation which is at least equivalent to pasteurisation, cultured with micro-organisms which belong to the type(s) characteristic of each product. This fermentation leads to the milk forming in a mass. The coagulum which is obtained is firm, with no exudation of whey. Yoghurt and curdled milk are the fermented milks which are most commonly consumed. The term "yoghurt" is reserved for fermented milk which is obtained by the development only of specific thermophilic lactic acid bacteria (*Lactobacillus bulgaricus* and *Streptococcus thermophilus*) which must be cultured simultaneously and must be found to be live in the final product, at a ratio of at least 10 million bacteria per gram relative to the milk-containing portion. In the context of the invention, "curdled milk" is intended to refer to fermented milks for which bacteria other than Lactobacillus bulgaricus and *Streptococcus thermophilus* are used. The most commonly used are currently *Bifidobacterium longum*, *Bifidobacteruim bifidum* and *Lactobacillus acidophilus*. In the context of the present invention, the expression "fresh fermented milk product" is used to describe a fermented milk product which contains live ferments, as opposed to thermally processed fermented milk products which have been subjected to a thermal processing operation and which no longer contain live ferments (Codex Alimentarus).

"Included element" is intended to refer to an element which has a visible, recognisable, form in the cheese product. Examples of included elements are fresh or dried fruit (for example, apricots, nuts such as Grenoble nuts, hazelnuts, almonds, etc. . . . ), whole or in pieces, or pieces of vegetable and/or meat, spices and seasoning, etc. . . .

"Agitation" is intended to refer to a mechanical processing operation which allows the incorporation of a component in another component and the homogenisation of the mixture with no destruction of the original components.

The rotation speed for the agitation is preferably between 50 and 600 rpm.

"Shearing" is intended to refer to an intense mechanical action on the structure of the processed product in order to modify the structure thereof in order to obtain a different product. The shearing action used according to the invention preferably brings about an emulsification of the mixture. This processing can be carried out, for example, by a device of the cutter type or any equivalent mixing means, such as a kneader, batch mixer, boiler-mixer, mixer, co-mixer, extruder etc. . . .

"Weak shearing" is intended to refer to the stresses which are not greater than those applied in an item of equipment of the "cutter" type at speeds of up to 1500 rpm. It is possible to mention, for example, the processing operations which are carried out in commercial devices of the cutter type (for example, those sold under the name STEPHAN®) which are traditionally used in butchery or in the production of processed cheese and which rotate at speeds of between 50 and 1500 rpm, advantageously between 200 and 500 rpm. The higher the cutting speed, the more the protein network of the cheese is destroyed and therefore the more the texture is modified.

Method for Producing Novel Cheese Products

The invention therefore proposes a method for producing a cheese product having the fibrous texture of a drawn-curd cheese and having the taste of a fresh fermented milk product, the method comprising the steps consisting in:

a) reducing, by means of grinding or grating, the size of a drawn-curd cheese, a mixture of drawn-curd cheeses, or a mixture of cheeses comprising at least 50% by weight, relative to the total weight of the mixture, of one or more drawn-curd cheeses;

b) heating, to a temperature of between 60 and 70° C., and processing, with a shearing action, the drawn-curd cheese, the mixture of drawn-curd cheeses or the mixture of cheeses comprising at least 50% by weight of one or more drawn-curd cheeses, for a length of time which is sufficient to obtain a homogeneous and malleable cheese mass which allows the incorporation of a fermented product;

c) incorporating, with agitation, a fresh fermented milk product which has a live flora, in a sufficient quantity to confer on the final cheese product the aromatic characteristics of the incorporated fermented milk product, the cheese mass being cooled beforehand to a temperature lower than the destruction temperature of the flora which are present in the fresh fermented milk product.

Optionally, the cheese product obtained can be shaped and cooled, before or after packaging.

In an unexpected manner, the applicant has thus shown that, in order to preserve the textural characteristics of the drawn curds, it was essential to process them, or a mixture which contains them, at a temperature of at least 60° C. and at the most 70° C., more particularly at a temperature of between 65 and 70° C., since:

at temperatures of greater than 70° C., the original structural state (fibrous texture) of the drawn curds is destroyed by the thermal processing operation, and the thermal processing tends to produce cheese products of the spreading cheese type, at temperatures of less than 60° C., a non-homogeneous mass is obtained, which has a phase separation, that is to say, an exudation of serum which renders the product non-malleable. A temperature greater than 60° C., and more particularly greater than 65° C., allows this phenomenon of exudation to be prevented.

Furthermore, processing at temperatures of greater than 60° C., for example, 65° C., has the advantage of promoting the microbiological protection of the product.

It is possible to use a mixture of one or more drawn-curd cheeses with other cheeses or raw milk products, such as milk concentrates or dairy curds. The mixture contains drawn-curd cheese at a proportion of at least 50% by weight relative to the total weight of the mixture, in order to obtain a final product having a fibrous texture. The cheeses used in the mixture, with the exception of drawn-curd cheese(s), are preferably pressed-curd cheeses, such as gouda, cheddar or edam, which may be slightly ripened or unripened, in order not to mask the taste of fresh fermented milk product in the final product. The mixture of cheeses comprising at least 50% by weight of one or more drawn-curd cheeses may thus comprise one or more pressed-curd cheeses selected from the group constituted by gouda, cheddar and edam, the pressed-curd cheeses being slightly ripened or unripened. "Slightly ripened or unripened cheese" is intended to refer to cheeses which, during their production, have not been subjected to culture with ripening bacteria, or, if the curds have been cultured with lactic acid ferments (acidification), cheeses which are conserved at temperatures such that these ferments do not develop, for example, at a temperature of less than 5° C. These are therefore cheeses which have not developed aromatic characteristics which are capable of masking the taste of the fresh fermented milk product added during the method according to the invention.

The drawn-curd cheese is preferably mozzarella. Any other product which has identical characteristics, whether it originates from the processing of milk from a cow or other mammal, or is obtained from raw plant materials, for example, soya, or a mixture of animal and plant raw materials, falls within the scope of the invention. A mixture of drawn-curd cheeses, preferably containing mozzarella, can, for example, be used.

A drawn-curd cheese, or a mixture which is constituted exclusively by drawn-curd cheeses, is preferably used in order to implement the method according to the invention. A method for implementing the method according to the invention thus comprises the steps consisting in:

a) reducing, by means of grinding or grating, the size of a drawn-curd cheese, or a mixture of drawn-curd cheeses;
b) heating, to a temperature of between 60° C. and 70° C., and processing, with a shearing action, the drawn-curd cheese, or the mixture of drawn-curd cheeses, for a length of time which is sufficient to obtain a homogeneous and malleable cheese mass which allows the incorporation of a fermented product;
c) incorporating, with agitation, a fresh fermented milk product which has a live flora, in a sufficient quantity to confer on the final cheese product the aromatic characteristics of the fermented milk product incorporated, the cheese mass being cooled beforehand to a temperature lower than the destruction temperature of the flora which is present in the fresh fermented milk product.

Advantageously, prior to the thermal processing step b) described above, the size of the drawn-curd cheese, or the mixture constituted by or containing drawn-curd cheeses, is reduced by means of grating or grinding. The drawn-curd cheese, or the mixture constituted by or containing drawn-curd cheeses, is preferably grated into strands, ground and then cut into pieces of less than 2 cm, preferably into pieces of a size approximately equal to 1 mm. The invention therefore relates to a method in which the drawn-curd cheese, the mixture of drawn-curd cheeses, or the mixture of cheeses comprising at least 50% by weight of one or more drawn-curd cheeses is reduced into pieces of less than 2 cm during step a) described above.

This grinding step preferably involves a mechanical shearing processing operation, for example, carried out in a cutter or using any other equivalent means, such as a grinder or extruder. It is preferably a high-intensity shearing operation, for example, a processing operation using a cutter at 1300 rpm, for approximately 30 seconds.

At the end of this step, it is possible to add included elements, preferably in a quantity of less than or equal to 10% by weight relative to the weight of the final cheese product.

This raw material, which is advantageously ground and which may comprise included elements, is then subjected to a thermal processing operation at a temperature of between 60 and 70° C. as indicated in step b) above, preferably between 65 and 70° C.

More specifically, this thermal processing step may comprise a phase for heating to the desired temperature, that is to say, up to 60-70° C., preferably between 65 and 70° C., then a holding phase, that is to say, a phase for maintaining the mixture at a constant temperature.

In addition to the thermal processing, a mechanical shearing processing operation, preferably with a weak shearing action, is also applied to this raw material. This processing operation is preferably carried out in a cutter or any equivalent mixing means, such as a batch mixer, boiler-mixer, mixer, co-mixer or extruder, etc. . . .

In this manner, according to a specific embodiment, step b) for thermal processing may comprise a step for heating up to a temperature of between 60° C. and 70° C., preferably between 65 and 70° C., with a shearing action, of the drawn-curd cheese, or the mixture of drawn-curd cheeses, or the mixture of cheeses comprising at least 50% by weight of one or more drawn-curd cheeses, and a holding step, which involves maintaining the temperature of the drawn-curd cheese or the mixture of drawn-curd cheeses, for a length of time which is sufficient to obtain a homogeneous and malleable cheese mass.

The duration of the thermal processing operation carried out may depend on the nature of the mechanical processing to which the raw material is subjected at the same time. The adjustment of the duration of the heating and holding phases is, however, within the reach of the person skilled in the art. The total duration of the thermal processing operation is preferably generally between 1 and 6 minutes, advantageously between 1 and 5 minutes, more preferably between 2 and 4 minutes. Advantageously, the heating phase lasts between approximately 30 seconds and four minutes, preferably between 1 and 2 minutes, and the holding phase lasts between approximately 30 seconds and 2 minutes, preferably between approximately 40 and 90 seconds.

The cheese mass obtained is then cooled as indicated in step c) above, to a temperature lower than the temperature for inactivation of the ferments present in the fermented milk product or the mixture of fermented milk products which it is desirable to incorporate into this mass. This temperature is, for example, preferably less than or equal to 50° C., for the yoghurt ferments *Lactobacillus bulgaricus* and *Streptococcus thermophilus*.

The cooling can be carried out in accordance with a number of alternatives: for example, by means of mechanical processing in a cutter, with a weak shearing action, with a rotation speed of between 50 and 600 rpm, or using any equivalent means, such as a batch mixer, boiler-mixer, mixer, co-mixer or extruder etc. . . .

In a third step, with agitation, preferably with weak agitation, for example, at approximately 50-600 rpm, preferably between 100 and 250 rpm, the desired quantity of fresh fermented milk product is incorporated in the cooled cheese mass until a homogeneous mixture is obtained. The fresh fermented milk product can equally well be in either the liquid or paste state. The quantity incorporated is dependent on the final aromatic intensity which it is desirable to obtain. Preferably, the proportion of fresh fermented milk product is less than 20%, preferably between 3 and 20%, by weight relative to the total weight of the mixture constituted by the cheese mass and the fermented milk product, in order to maintain the firm and fibrous texture in the final product.

Beyond a content of 20%, the texture of the final product deviates from the texture of the drawn curd used owing to excessive softening and the final product obtained in that case does not allow the set objective to be achieved.

It will be understood that the method according to the invention is not limited to the embodiment according to which a single fresh fermented milk product is added to the cheese mass. The incorporation of a mixture of fresh fermented milk products, up to a limit of 20%, preferably between 3 and 20%, by weight relative to the weight of the final mixture constituted by the cheese mass and the milk products, is also within the scope of the invention. Furthermore, the percentage of live ferments in the final mixture can be increased by incorporating ferment strains used for the production of fermented milk products, such as those mentioned above. These strains can be added in the frozen or freeze-dried form and contribute to increasing the fresh taste of the cheese product according to the invention.

Advantageously, the fresh fermented milk product, or the mixture of fresh fermented milk products, has a dry-extract content of less than 30%.

Preferably, a fermented milk product according to the invention is a yoghurt, but any other fermented product containing a live microbial flora is within the scope of the invention, whether it is of animal or plant origin, such as, for example, fermented products based on soya, such as soya yoghurt. It is, for example, possible to add fermented products which contain "probiotic" bacteria, such as bifidobacteria which have a beneficial effect on health. Curdled milk constitutes another example of a fermented milk product according to the invention.

It is also possible to intensify the aromatic note by adding a small quantity of flavouring to the mixture which is constituted by the cheese mass and at least one fermented milk product. Preferably, flavourings of fermented milk products, such as acetoin, acetaldehyde, diacetyl and acetic acid can be used in the context of the present invention. Included elements can further be added during this step.

The cheese product, which is thus obtained following this third step and which comprises the live ferments, can then be shaped. An additional cooling step can be carried out. The final cheese product is preferably cooled to a temperature of less than 15° C. Packaging can be carried out before or after the cooling using any appropriate means: packaging in plastics material, aluminium, a container or dish having a lid, of the twin-shell type, coating with wax, with an edible coating, etcetera.

The step for shaping the final cheese product can be carried out using any conventional means for measuring, pouring or moulding in accordance with the firmness of the product, the desired shape and size of the final product.

According to a specific embodiment, the invention proposes a method which comprises the steps consisting in:
a) grinding the mozzarella into pieces of less than 2 cm;
b) heating the ground mozzarella, for from 2 to 4 minutes, to a temperature of approximately 66° C., in a boiler-mixer at a rotation speed of 160 rpm, then maintaining the ground mozzarella at 66° C. for from 1 to 2 minutes in order to obtain a homogeneous and malleable cheese mass;
c) cooling the cheese mass obtained in this manner to 50° C. with agitation at 100 rpm;
d) incorporating yoghurt in this cheese mass with agitation at 100 rpm, the yoghurt being added at a quantity approximately equal to 10% by weight relative to the total weight of the mixture constituted by the cheese mass and the yoghurt; and
e) optionally shaping and packaging the product obtained.

According to another specific embodiment, the method according to the invention comprises the steps which consist in:
a) grinding mozzarella in a cutter at a rotation speed of 1300 rpm for approximately 30 seconds;
b) adding apricot pieces;
c) heating the mixture of ground mozzarella and apricot pieces for from two to three minutes, to a temperature of approximately 70° C., in a cutter at a rotation speed of 500 rpm, then maintaining the ground mozzarella mixture at 70° C. for from 40 to 60 seconds, with agitation at 250 rpm, in order to obtain a homogeneous and malleable cheese mass;
d) cooling the cheese mass obtained in this manner to 55° C.;
d) incorporating kefir in this cheese mass with agitation at 250 rpm; and
e) optionally shaping and packaging the product obtained;
the relative proportions of mozzarella, apricot pieces and kefir, by weight relative to the total weight of the mixture constituted by the mozzarella, the apricot pieces and the kefir being approximately equal to 91%, 4% and 5%, respectively.

Preferably, in this embodiment in which a device of the cutter type is used, the mixture constituted by the ground cheese and the included elements is heated to approximately 70° C. in 2 to 3 minutes, and maintained at this temperature for approximately 40 seconds.

According to still another embodiment, the invention relates to the production of a cheese product containing 8% of yoghurt, 60% of mozzarella, and 32% of unripened gouda. The method according to the invention comprises the steps which consist in:
a) grating a mixture of mozzarella and non-ripened gouda;
b) processing the mixture at a temperature of 65° C. for 1.5 minutes in a cutter with agitation at 100 rpm;
c) cooling the mixture to 50° C. with agitation at 100 rpm; and
d) incorporating yoghurt, relative to the total weight of the final product, with agitation at 100 rpm;
e) optionally shaping and packaging the mixture;
the relative proportions of mozzarella, unripened gouda and yoghurt, by weight relative to the total weight of the mixture constituted by the mozzarella, the unripened gouda and the yoghurt being approximately equal to 60%, 32% and 8%, respectively.

Cheese Products

The method according to the invention allows new cheese products to be obtained which have a firm, resilient and fibrous texture and the aromatic profile of one or more fresh fermented milk product(s), whilst maintaining the flora of the fermented milk product in the live state.

More specifically, the cheese products according to the invention have a texture profile which is substantially similar to that of the original drawn-curd cheese, in particular mozzarella.

The determination of the texture profile of a cheese can be readily carried out by the person skilled in the art, for example, using the texture analysis method (Texture Profile Analysis) with double compression. This measurement method, which is used for pressed-curd cheeses, is particularly suitable for non-baked homogeneous curds. The principle of this method is to imitate mastication between the molars in order to evaluate the texture criteria of the cheese, such as firmness, resilience and cohesion. This evaluation is carried out using two successive compression cycles for a sample between two parallel plates using a universal traction/compression machine (TAXT2i Texture Analyser, Stable Micro Systems, UK). In practice, a probe which is connected to a force sensor compresses the sample at a constant rate and the force required to compress the sample to a given degree is recorded.

Preferably, the cheese products according to the invention have, according to the texture profile analysis (TPA), a firmness of between 3N and 6N, a resilience of between 67% and 87% and a cohesion of between 45% and 65%.

The products obtained have a dry-extract greater than 40%, a fatty material content of between 3 and 60%, preferably between 5 and 60%, expressed as fatty material/dry-extract.

Owing to their firm and resilient texture, these cheese products can be sliced and nibbled on to be used as a snack-type food, for example. They can be of any shape (balls, spheres, cubes, parallelepipeds, egg-like, etc. . . . ) and of any weight, preferably from 5 to 500 g.

The method will be better understood from the description and the examples of use below.

EXAMPLE 1

There is carried out a comparison of the number of live ferments in a cheese product, obtained after thermally processing a mixture of mozzarella and yoghurt or in accordance with the method of the invention.

A product is prepared containing 90% of mozzarella and 10% of yoghurt. The survival rates of the yoghurt ferments present in a cheese product obtained using a conventional method, that is to say, by thermally processing a mixture of yoghurt and mozzarella (method 1) at 66° C., are compared with those measured for a cheese product produced using the method of the invention (method 2).

Production Method No. 1:

The mozzarella is pre-ground with processing by a cutter, at a rotation speed of 1000 rpm for 40 seconds. Yoghurt is added to the pre-ground mozzarella, in sufficient quantity to obtain a mozzarella/yoghurt ratio equal to 90/10 (weight/weight).

The mixture is then heated, at a rotation speed of 500 rpm, by means of direct vapour injection, to a temperature of 66° C., then allowed to rest (that is to say, held at temperature) at 66° C. with agitation at 250 rpm for 30 seconds.

The curd obtained is shaped in a shaping device of the CMT type, then pressed in a mould at a pressure of 2 bar for 1 minute.

The products obtained in this manner have the following characteristics:

Dry-extract (ES): 44.7%
pH: 5.51
Fatty material/dry-extract (G/S): 40%

Analysis of the Yoghurt Ferments

|  | Lactobacillus bulgaricus | Streptococcus thermophilus |
| --- | --- | --- |
| Yoghurt only | $7.6 \times 10^7$ | $3.4 \times 10^8$ |
| Mixture 90% of mozzarella + 10% of yoghurt before heating | $1.2 \times 10^6$ | $1.3 \times 10^7$ |
| Final product containing 10% of yoghurt | $5.2 \times 10^4$ | $4 \times 10^6$ |

The above analysis of the yoghurt ferments shows that the content of the final product in terms of yoghurt ferments is reduced by the thermal processing operation relative to the non-heated mixture by 2 "log" for *Lactobacillus bulgaricus* and 1 "log" for *Streptococcus thermophilus*.

Production Method No. 2:

The pre-ground mozzarella is heated to 66° C. in a boiler-mixer (type KS—Karl Schnell) by means of direct vapour injection at a low rotation speed (120 rpm) for from 2 to 4 minutes, until a resilient and homogeneous mass is obtained. This cheese mass is then held at 66° C. with agitation at 100 rpm for 1 minute. A cooling step is then carried out with agitation at 100 rpm, to a temperature of 50° C.

10% of yoghurt is incorporated with weak agitation (100 rpm).

The curd which is obtained in this manner is shaped in a shaper of the CMT type, then pressed in a mould, at a pressure of 2 bar, for 1 minute, in order to obtain a ball weighing 20 g.

The final products obtained in this manner have the following characteristics:

ES: 49.3%
pH: 5.54
G/S: 37%

Analysis of the Yoghurt Ferments

|  | Lactobacillus bulgaricus | Streptococcus thermophilus |
| --- | --- | --- |
| Yoghurt only | $7.6 \times 10^7$ | $3.4 \times 10^8$ |
| Mozzarella after cooling to 50° C. | 0 | 0 |
| Final product containing 10% of yoghurt | $7.6 \times 10^6$ | $4 \times 10^7$ |

The results above indicate that the flora of yoghurt is found integrally, incorporated in a proportion of 10%, in the final product. The method according to the invention therefore allows a large proportion of the flora of the yoghurt to be preserved in the final product compared with the method of example 1.

This example therefore shows the entire advantage of the method according to the invention with regard to the survival of the yoghurt ferments in the final product.

EXAMPLE 2

A product is prepared according to the method of the invention containing 91% of mozzarella, 5% of kefir and 4% of apricot pieces in accordance with the following method:

Mozzarella (G/S=27% and ES=48%) is pre-ground in a cutter at a rotation speed of 1300 rpm for 30 seconds. Apricot pieces are then added. The mixture is heated to 70° C. in a cutter, with weak agitation (500 rpm). 5% of kefir is then incorporated in the cheese mass which has been obtained in this manner and which has been chilled to 55° C. The whole is maintained with weak agitation at 250 rpm for 45 seconds.

The final mixture is passed over a shaping device in order to produce "batons" ("string cheese") which are then packaged in sachets ("flow pack").

The products obtained are in snack type form, in the form of cheese batons having a firm and fibrous texture with inclusions of apricot pieces and an excellent fresh taste of kefir.

EXAMPLE 3

The texture profile of a cheese product according to the invention, prepared from mozzarella and yoghurt (8%) was analysed in accordance with the TPA double compression method, using a TAXTi2 Texture Analyser device. The comparison of the texture of the product according to the invention with the texture of the original mozzarella is set out in the table below:

|  | Firmness | Resilience | Cohesion |
|---|---|---|---|
| Mozzarella | 3.56 ± 0.27 N | 67.70 ± 0.35% | 58.4 ± 0.69% |
| Cheese product (mozzarella + yoghurt 8%) | 3.84 N | 86.05% | 49.85% |

EXAMPLE 4

A product containing 8% of yoghurt, 60% of mozzarella and 32% of unripened gouda is produced in accordance with the method of the invention.

The mozzarella and the gouda are grated and the grated products are heated to 65° C. in a cutter with weak agitation (100 rpm) with a holding time of 1.5 minutes.

The mixture is cooled to 50° C. with weak agitation (100 rpm) and 8% of yoghurt by weight is incorporated relative to the final weight of the mixture, still with weak agitation (100 rpm).

The curd obtained is shaped in a CHT shaping device then pressed in a mould at a pressure of 2 bar for 1 minute.

The products obtained have the following characteristics:
ES: 48%
pH: 5.52
G/S: 40%

Analysis of the Yoghurt Ferments

|  | Lactobacillus bulgaricus | Streptococcus thermophilus |
|---|---|---|
| Yoghurt only | $7.6 \times 10^7$ | $3.4 \times 10^8$ |
| Mixture of cheeses only | 0 | 0 |
| Final product containing 8% of yoghurt | $4 \times 10^6$ | $3 \times 10^6$ |

The invention claimed is:

1. A method for producing a cheese product having a firm, resilient and fibrous texture and having the taste of a fresh fermented milk product, comprising the steps of:
    a) reducing, by means of grinding or grating, the size of a drawn-curd cheese, a mixture of drawn-curd cheeses, or a mixture of cheeses comprising at least 50% by weight of one or more drawn-curd cheeses;
    b) heating, to a temperature of between 60° C. and 70° C., and processing, with a shearing action, the drawn-curd cheese, the mixture of drawn-curd cheeses or the mixture of cheeses comprising at least 50% by weight of one or more drawn-curd cheeses, for a total duration between 1 and 6 minutes to obtain a cheese mass;
    c) obtaining said cheese product having a firm, resilient and fibrous texture and having the taste of a fresh fermented milk product by incorporating, with agitation, a fresh fermented milk product which has a live flora, in a quantity of less than 20% by weight relative to the total weight of the mixture constituted by the cheese mass and the fermented milk product, the cheese mass being cooled beforehand to a temperature lower than the destruction temperature of the flora which is present in the fresh fermented milk product;
    d) optionally shaping and packaging the product obtained.

2. The method according to claim 1, comprising the steps of:
    a) reducing, by means of grinding or grating, the size of a drawn-curd cheese, or a mixture of drawn-curd cheeses;
    b) processing, at a temperature of between 60° C. and 70° C., with a shearing action, the drawn-curd cheese, or the mixture of drawn-curd cheeses, for a total duration between 1 and 6 minutes to obtain a cheese mass;
    c) obtaining said cheese product having a firm, resilient and fibrous texture and having the taste of a fresh fermented milk product by incorporating a fresh fermented milk product in this cheese mass, with agitation, at a quantity of less than 20% by weight relative to the total weight of the mixture constituted by the cheese mass and the fresh fermented milk product, the cheese mass being cooled beforehand to a temperature lower than the destruction temperature of the flora present in the fresh fermented milk product; and
    d) optionally shaping and packaging the product obtained.

3. The method according to claim 1, wherein the quantity of the fermented milk product is between 3 and 20% by weight relative to the total weight of the mixture constituted by the cheese mass and the milk product.

4. The method according to claim 1, wherein the fermented milk product has a dry-matter content of less than 30%.

5. The method according to claim 1, wherein the fermented milk product is yoghurt.

6. The method according to claim 1, wherein the drawn-curd cheese is mozzarella.

7. The method according to claim 1, wherein the mixture of cheeses comprising at least 50% by weight of one or more drawn-curd cheeses additionally comprises one or more pressed-curd cheeses selected from the group consisting of gouda, cheddar and edam, the pressed-curd cheeses being slightly ripened or unripened.

8. The method according to claim 1, wherein the steps a) and b) and the cooling of the cheese mass involve a mechanical processing operation which is carried out in a cutter at a velocity of between 50 and 600 rpm.

9. The method according to claim 1, wherein the steps a) to c) involve a mechanical processing operation which is carried out in a batch mixer, boiler-mixer, a mixer, a kneader or an extruder.

10. The method according to claim 1, in which the thermal processing of step b) is maintained for a total duration of between 1 and 5 minutes.

11. The method according to claim 1, in which the final cheese product is formed by means of pouring, measuring or moulding and is cooled to a temperature of less than 15° C.

12. The method according to claim 1, in which the drawn-curd cheese or the mixture of drawn-curd cheeses is reduced to pieces of less than 2 cm during step a).

13. The method according to claim 1, comprising the steps of:
  a) grinding a drawn-curd cheese which is a mozzarella into pieces of less than 2 cm;
  b) heating the ground mozzarella, for from 2 to 4 minutes, to a temperature of approximately 66° C., in a boiler-mixer at a rotation speed of 160 rpm, then maintaining the ground mozzarella at 66° C. for from 1 to 2 minutes to obtain a cheese mass;
  c) cooling the cheese mass obtained in this manner to 50° C. with agitation at 100 rpm;
  d) obtaining said cheese product having a firm, resilient and fibrous texture and having the taste of a fresh fermented milk product by incorporating yoghurt in this cheese mass with agitation at 100 rpm, the yoghurt being added at a quantity approximately equal to 10% by weight relative to the total weight of the mixture constituted by the cheese mass and the yoghurt; and
  e) optionally shaping and packaging the product obtained.

14. The method according to claim 1, comprising the steps of:
  a) grinding mozzarella in a cutter with agitation at 1300 rpm for approximately 30 seconds;
  b) adding apricot pieces;
  c) heating the mixture of ground mozzarella and apricot pieces for two to three minutes, to a temperature of approximately 70° C., in a cutter at a rotation speed of 500 rpm, then maintaining the ground mozzarella mixture at 70° C. for 40 to 60 seconds, with agitation at 250 rpm to obtain a cheese mass;
  d) cooling the cheese mass obtained in this manner to 55° C.;
  e) obtaining said cheese product having a firm, resilient and fibrous texture and having the taste of a fresh fermented milk product by incorporating kefir in this cheese mass with agitation at 250 rpm; and
  f) optionally shaping and packaging the product obtained;
  the relative proportions of mozzarella, apricot pieces and kefir, by weight relative to the total weight of the mixture constituted by the mozzarella, the apricot pieces and the kefir being approximately equal to 91%, 4% and 5%, respectively.

15. The method according to claim 1, comprising the steps of:
  a) grating a mixture of mozzarella and unripened gouda;
  b) processing the mixture at a temperature of 65° C. for 1.5 minutes in a cutter with agitation at 100 rpm;
  c) cooling the mixture to 50° C. with agitation at 100 rpm; and
  d) obtaining said cheese product having a firm, resilient and fibrous texture and having the taste of a fresh fermented milk product by incorporating yoghurt into the cooled mixture with agitation at 100 rpm;
  e) optionally shaping and packaging the product obtained;
  the relative proportions of mozzarella, unripened gouda and yoghurt, by weight relative to the total weight of the mixture constituted by the mozzarella, the unrefined gouda and the yoghurt being approximately equal to 60%, 32% and 8%, respectively.

16. A cheese product having a firm, resilient and fibrous texture and having the taste of a fresh fermented milk product which is obtainable by the method according to claim 1.

17. The method according to claim 2, wherein the quantity of the fermented milk product is between 3 and 20% by weight relative to the total weight of the mixture constituted by the cheese mass and the fermented milk product.

18. The method according to claim 2, wherein the fermented milk product has a dry-matter content of less than 30%.

19. The method according to claim 3, wherein the fermented milk product has a dry-matter content of less than 30%.

20. The method according to claim 2, wherein the steps a) and b) and the cooling of the cheese mass involve a mechanical processing operation which is carried out in a cutter at a velocity of between 50 and 600 rpm.

21. The method according to claim 1, wherein in step c) the cheese mass is cooled beforehand to a temperature less than or equal to 50° C.

22. The method according to claim 2, wherein in step c) the cheese is cooled beforehand to a temperature less than or equal to 50° C.

23. The cheese product according to claim 16, which has a firmness of 3N to 6N, a resilience of 67% to 87% and a cohesion of 45% to 65% as measured by texture profile analysis method.

24. The cheese product according to claim 16, which has a dry-matter greater than 40% and a fatty material content between 3 and 60% expressed as fatty material content relative to the dry-matter content.

* * * * *

UNITED STATES PATENT AND TRADEMARK OFFICE
CERTIFICATE OF CORRECTION

PATENT NO.        : 8,603,553 B2                                                                    Page 1 of 1
APPLICATION NO.   : 10/574352
DATED             : December 10, 2013
INVENTOR(S)       : Florence Viaud It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 842 days.

Signed and Sealed this
Twenty-second Day of September, 2015

Michelle K. Lee
*Director of the United States Patent and Trademark Office*